(12) United States Patent
Hawker et al.

(10) Patent No.: US 12,142,292 B2
(45) Date of Patent: Nov. 12, 2024

(54) SUPERIMPOSING HIGH-FREQUENCY COPIES OF EMITTED SOUNDS

(71) Applicant: International Business Machines Corporation, Armonk, NY (US)

(72) Inventors: Samuel B. Hawker, Winchester (GB); Alexander John Naylor-Teece, Newbury (GB); Bhavnit Patel, Luton (GB); Grace Jansen, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 17/209,391

(22) Filed: Mar. 23, 2021

(65) Prior Publication Data

US 2022/0310111 A1    Sep. 29, 2022

(51) Int. Cl.
*G10L 25/51*    (2013.01)
*G10L 25/93*    (2013.01)

(52) U.S. Cl.
CPC ............. *G10L 25/51* (2013.01); *G10L 25/93* (2013.01)

(58) Field of Classification Search
CPC ................................ G10L 25/51; G10L 25/93
See application file for complete search history.

(56) References Cited

U.S. PATENT DOCUMENTS

| | | | |
|---|---|---|---|
| 4,507,791 A * | 3/1985 | Gundry | H04B 1/62 375/27 |
| 5,491,839 A | 2/1996 | Schotz | |
| 6,118,878 A * | 9/2000 | Jones | H03B 29/00 381/72 |
| 9,502,020 B1 | 11/2016 | Abdollahzadeh Milani et al. | |
| 2009/0141907 A1 | 6/2009 | Kim et al. | |
| 2012/0295560 A1 | 11/2012 | Mufti | |
| 2013/0136275 A1 | 5/2013 | Qiu et al. | |
| 2017/0064246 A1 | 3/2017 | Kline et al. | |
| 2018/0103229 A1* | 4/2018 | Yang | H04N 5/44 |
| 2018/0226064 A1 | 8/2018 | Seagriff et al. | |
| 2019/0206396 A1* | 7/2019 | Chen | G10L 15/22 |
| 2020/0051534 A1 | 2/2020 | Bradley et al. | |
| 2020/0175961 A1* | 6/2020 | Thomson | G10L 15/06 |
| 2020/0287632 A1 | 9/2020 | Shoop et al. | |

(Continued)

FOREIGN PATENT DOCUMENTS

| | | |
|---|---|---|
| CN | 112306448 A | 2/2021 |
| WO | 2022199320 A1 | 9/2022 |

OTHER PUBLICATIONS

"Superposition of Sound Waves," Wolfram Demonstrations Project, Mar. 2011, 2 pages https://demonstrations.wolfram.com/SuperpositionOfSoundWaves/.

(Continued)

*Primary Examiner* — Richemond Dorvil
*Assistant Examiner* — Ethan Daniel Kim
(74) *Attorney, Agent, or Firm* — Stosch Sabo

(57) ABSTRACT

An audio emitter configured to emit a sound creates a high-frequency copy of the sound to be emitted. The high-frequency copy of the sound is superimposed over the sound, resulting in a composite signal. The composite signal is emitted by the emitter. The high-frequency copy is at a frequency inaudible to humans, enabling a receiver to identify the emitter and/or the sound.

15 Claims, 8 Drawing Sheets

(56) References Cited

U.S. PATENT DOCUMENTS

2020/0294533 A1* 9/2020 Shen .................. G10L 25/78
2020/0351605 A1* 11/2020 Park .................. H04S 7/00

OTHER PUBLICATIONS

"Active noise control," Wikipedia The Free Encyclopedia, Printed Mar. 16, 2021, 4 pages https://en.wikipedia.org/wiki/Active_noise_control.

"Signaling (telecommunications)," Wikipedia The Free Encyclopedia, Printed Mar. 16, 2021, 4 pages https://en.wikipedia.org/wiki/Signaling_(telecommunications)#In-band_versus_out-of-band_signaling.

"Out-of-band signaling," TechTarget Contributor, Last Updated in Nov. 2006, 4 pages https://searchnetworking.techtarget.com/definition/out-of-band-signaling.

Murison, "Why transmitting data as sound waves could transform IoT networking | Exclusive CTO Q&A," Internet of Business, Printed Mar. 22, 2021, 6 pages, https://internetofbusiness.com/data-sound-chirp/.

* cited by examiner

SUPERIMPOSING HIGH-FREQUENCY COPIES OF EMITTED SOUNDS

BACKGROUND

The present invention relates to identifying emitted sounds from emitter devices, and more specifically, to transmitting and receiving information identifying emitted sounds received at a receiver device from emitter devices.

There are a number of situations when electronically produced sounds are picked up by audio receivers which are intending to pick up or process other sounds. Sound that is not intended to reach a given audio receiver is often referred to as "noise."

For example, feedback produced by sound systems may be considered "noise." This is caused when a microphone picks up sound created by speakers that are playing the sound from the microphone. This results in the microphone picking up its own sound, picking up sound being played out of the speaker, and so on. In this case, the sound produced by the speaker is usually considered noise from the perspective of the microphone.

Voice controlled devices are often used in environments where other devices are creating sound, such as music or television programs. In these situations, voice commands can often be obscured by the noise produced by the other devices, resulting in the voice controlled device not being able to perform the intended task.

It is also not uncommon to be on a phone call in an environment where there is noise being produced by electronic sources such as public announcements, music, or television. In these situations, it can be hard for people at the other end of the call to be able to hear what the person is saying due to the electronically produced background noise.

SUMMARY

Some embodiments of the present disclosure can be illustrated as a method. The method comprises obtaining an audio signal to be emitted from the emitter device. The method further comprises processing a copy of the audio signal to apply a frequency change configured for the emitter device to result in an inaudible frequency copy of the audio signal. The method further comprises transmitting the audio signal and the inaudible frequency copy of the audio signal concurrently, wherein a receiver device is configured both to reverse a frequency change configured for the emitter device to a received inaudible frequency copy of the audio signal to discover a copy of the audio signal and to use the copy of the discovered audio signal.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
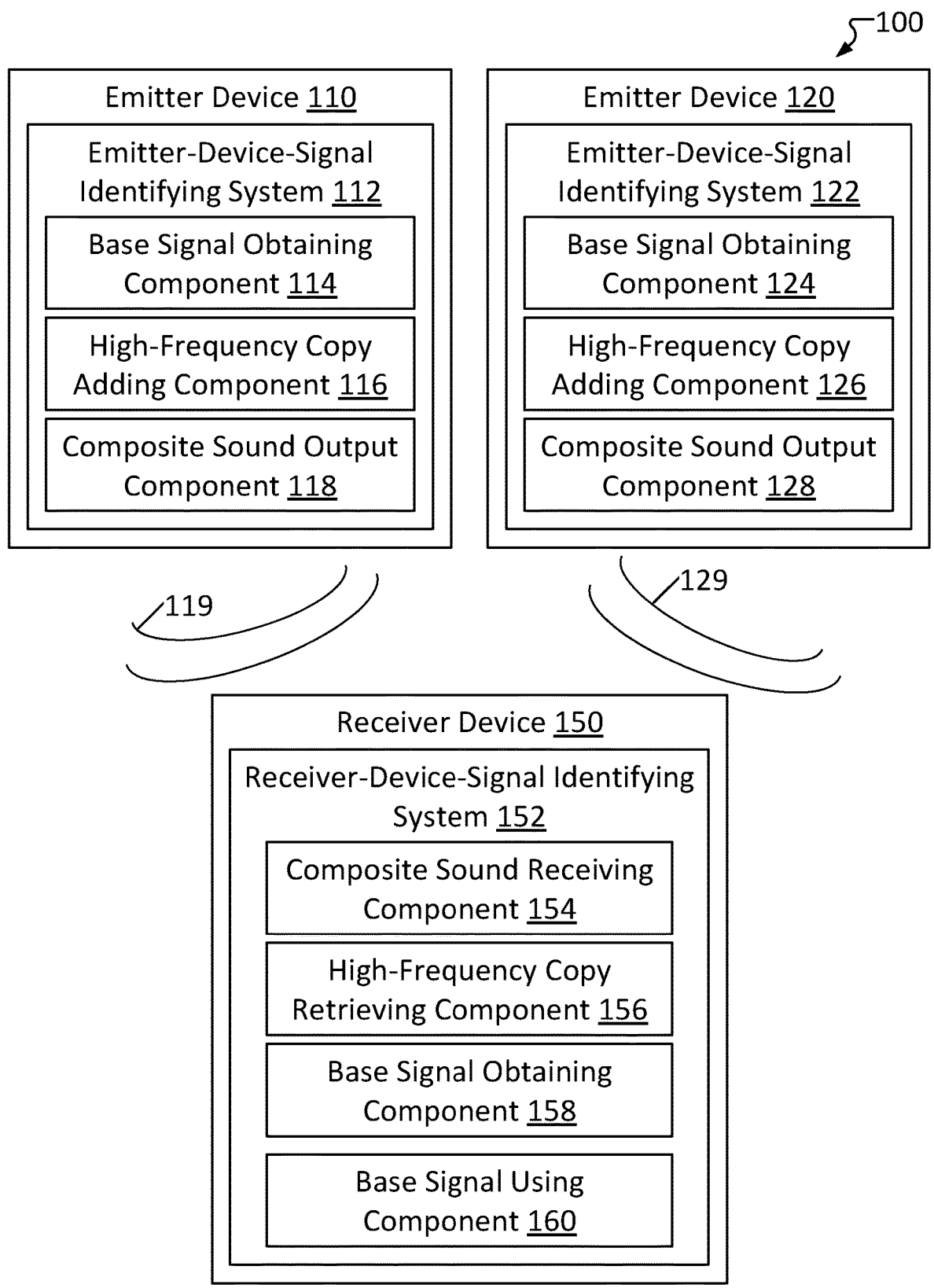
FIG. 1 is a schematic diagram showing multiple emitter devices and a receiver device, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

For simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Aspects of the present disclosure relate to systems and methods to identify sound sources. More particular aspects relate to superimposing a high-frequency copy of a sound being emitted into the sound in order to identify the emitter of the sound.

If an audio receiver is aware of what is noise in an input, it is possible to remove that noise before performing an intended task on the input (for example, converting speech to text). This can be done by adding an inverted copy of the noise to the input, which effectively cancels out the noise. Noise cancelling is a very well solved problem for repetitive sounds, as after two periods of the repeated sound, a controller can perform the above continuously to remove the repetitive noise from the input. However, for unrepetitive sounds, a controller is not able to predict the noise. In such cases, a controller must be made aware of which part of the audio input is noise through other means.

Current methods of transferring information to a controller about noise requires sending information about the noise over another channel such as Wi-Fi, wires, or Bluetooth. As a result, receiving devices have to be connected to a network shared by the noise producing devices, and information about the noise is sent over the network. Apart from the problem of connecting all devices to the same network, this also increases the amount of traffic sent over the network.

Systems and methods consistent with the present disclosure enable identification of audio signals electronically produced at one or more emitter devices and received at a receiver device by using inaudible frequency sound waves.

Throughout this disclosure, reference is made to audio signals. As used herein, a "composite" signal is composed of a "base" signal and a "copy" signal. The "base" signal refers to an electronically produced audio signal that is originally intended to be emitted by an emitter device, such as a speaker. Systems and methods of the present disclosure enable producing a copy of the base signal and combining the base signal and the copy signal into a composite signal. The composite signal may then be emitted by the emitter and received by a receiver.

As an illustrative example, a base signal to be emitted by an emitter may comprise a musical song to be played by a speaker. A human listener may desire to listen to the song but may also wish to issue a voice command to a receiver device, such as a smart assistant including a microphone. Both the smart assistant and the listener may be in proximity to the speaker. Ordinarily, the song may be picked up by the smart assistant's microphone, interfering with the listener's ability to issue voice commands to the smart assistant. However, a system consistent with the present disclosure may produce a high-frequency copy of the song and embed that copy into the song, resulting in a composite signal (i.e., an audio signal including both the song and the copy). The speaker may then emit the composite signal. The copy is at a high frequency inaudible to humans, so to the listener, the speaker will appear to be only playing the base signal (i.e., just the song) as normal. However, the copy can be "heard" by the smart assistant, as the smart assistant's microphone is capable of receiving the high-frequency copy. The smart assistant can utilize the copy to identify that the song is noise. Thus, the smart assistant is enabled to filter out the song from its input, improving the listener's ability to successfully give voice commands to the smart assistant.

Information about an electronically produced base audio signal is provided to the receiver device by emitting a copy of the audio signal alongside the base signal. The copy is converted to an inaudible frequency signal and embedded within the base signal, resulting in a composite signal including both the base signal and the copy. A receiver device, such as an audio receiver with a microcontroller, may receive and interpret the inaudible-frequency copy to identify the base signal. Using the inaudible-frequency copy of the base signal, there is no need for information to be received at a receiver device using any other channel.

The composite audio signal may be used in various ways. For example, the composite audio signal may be used to cancel a noise audio signal at the receiver device. The receiver device, upon determining that the composite signal includes a base signal that is considered (by the receiver device) to be noise, may create an inverted copy of the base signal and superimpose it over the received composite signal to cancel out the noise.

As another example, the composite audio signal may inform the receiver device about the identified audio signal. This can be achieved by embedding information in the frequency of the copy. For example, a predefined standard may indicate that an inaudible-frequency copy having a minimum frequency of 45,000 Hz corresponds to a base signal that is a musical song, while an inaudible-frequency copy having a minimum frequency of 50,000 Hz corresponds to a base signal that is an emergency announcement. Thus, a receiver may receive a first composite signal that includes an inaudible-frequency copy having a lower frequency of 45,000 Hz, informing the receiver that the first composite signal is music (more specifically, that the first composite signal includes a base signal which is music). The receiver may also receive a second composite signal including an inaudible-frequency copy with a lower frequency of 50,000 Hz, informing the receiver that the second composite signal includes a base signal which is an emergency announcement.

The information can also be embedded via a frequency change used in the conversion to an inaudible frequency signal (i.e., a difference between the copy signal's frequency and the base signal's frequency). For example, a predefined standard may indicate that musical songs should be identified via embedding inaudible-frequency copies at 1,050 times the frequency of the base signal, while emergency announcements should be identified at 1,300 times the frequency of the base signal. Thus, an emitter device configured to emit a base signal including a musical song with a frequency range of 40 Hz-13,000 Hz may generate an inaudible-frequency copy of the song at 42,000 Hz-13,650,000 Hz (i.e., 40 Hz*1,050 to 13,000 Hz*1,050). Were the base signal an emergency announcement instead, the emitter may generate the inaudible-frequency copy at 52,000 Hz-16,900,000. In either case, the copy is out of the range of human hearing, but the particular frequency range of the copy (relative to the base signal) can convey information useful to the receiver.

Similarly, the embedded information may include information identifying an emitter. For example, a first emitter may be configured to generate inaudible-frequency copies having a minimum frequency of 30,000 Hz, while a second emitter may be configured to generate inaudible-frequency copies having a minimum frequency of 32,000 Hz. Thus, if a receiver receives a composite signal including an inaudible-frequency copy having a minimum frequency of 32,000 Hz, the receiver may be made aware that the composite signal was received from the second emitter.

The described method enables a receiver device to be able to identify which part of the sound it receives is from electronic sources, even where the only input method to the receiving device is sound. A possible use case for this is removing sounds produced by other electronic devices from a received input before processing the input for its intended purpose. Another use case would be to identify a sound as received as an emergency announcement overriding other received inputs at the receiver device.

FIG. 1 is a schematic diagram 100 showing multiple emitter devices and a receiver device, consistent with several embodiments of the present disclosure. Two example emitters are depicted: emitter device 110, and emitter device 120 (collectively "emitters 110 and 120"). Emitters 110 and 120 are providing sound output that is being received by a receiver device 150. Specifically, emitter 110 is providing sound output 119, while emitter 120 is providing sound output 129.

Receiver device 150 may be any device that receives and processes audio signals. In order to function optimally, receiver device 150 may need to focus on certain inputs. For example, receiver device 150 may be a telephone device, a computer with a microphone for video or audio calls, or a voice-controlled device such as a personal assistant device, etc. Emitters 110 and 120 may be sound emitting electronic devices. For example, in a home environment, emitters 110 and 120 may include televisions, computers, and/or music devices, all of which may have inbuilt or external speaker systems. As additional examples, in a public environment, emitters 110 and 120 may be public announcement systems, public music devices, etc.

Emitter device 110 includes an emitter-device-signal identifying system 112 to enable identification of sound output 119. Emitter-device-signal identifying system 112 includes a base signal obtaining component 114 for obtaining an audio signal to be emitted from emitter device 110. As an example, emitter device 110 may be a speaker, and base signal obtaining component 114 may be configured to receive an audio signal (such as a song) that a user wishes to listen to via the speaker. Emitter-device-signal identifying system 112 further includes high-frequency copy adding component 116 for generating a high-frequency copy of the audio signal. High-frequency copy adding component 116 may generate a copy of the base signal obtained by base signal obtaining component 114, and apply a frequency change to the copy, resulting in a high-frequency copy of the audio signal. The high-frequency copy may be at a frequency outside of the range of human hearing. Emitter-device-signal identifying system 112 also includes a composite sound output component 118 for transmitting a composite signal (i.e., a signal including a combination of the base audio signal and the inaudible-frequency copy of the audio signal) concurrently. Composite sound output component 128 may be, for example, a physical speaker. Similarly, emitter device 120 includes emitter-device-signal identifying system 122, base signal obtaining component 124, high-frequency copy adding component 126, and composite sound output component 128, which may function similarly to their counterparts in emitter device 110.

In one embodiment, each of emitters 110 and 120 may apply a different frequency change to their audio signal. As an example, emitter 110 may be configured to emit a first base signal and emitter 120 may be configured to emit a second base signal. Emitter 110 may, via high-frequency copy adding component 116, generate a first high-frequency copy of the first base signal and add the first high-frequency copy to the first base signal. The first high-frequency copy may be at a frequency of, for example, 20,000 Hertz (Hz), or 20 kiloHertz (kHz). Meanwhile, emitter device 120 may, via high-frequency copy adding component 126, generate a second high-frequency copy of the second base signal and add the second high-frequency copy to the base signal. The second high-frequency copy may be at a frequency of, for example, 30,000 Hz. Thus, as emitters 110 and 120 are emitting composite signals having high-frequency copy signals at different frequencies, receiver device 150 is enabled to distinguish from which emitter device (e.g., emitter 110 or emitter 120) an audio signal originated, as described in further detail below.

In some embodiments, high-frequency copy adding component 116 may apply multiple different frequency changes either concurrently or consecutively to result in multiple inaudible-frequency copies of the audio signal to provide increased security.

Receiver device 150 includes a receiver-device-signal identifying system 152 that provides the described functionality at a receiver device 150. A single receiver device 150 is shown in FIG. 1, however multiple receiver devices 150 may be provided.

Receiver-device-signal identifying system 152 includes a composite sound receiving component 154 (such as, for example, a microphone) for receiving composite audio signals such as, for example, signal 119 and/or signal 129, including both base audio signals and inaudible-frequency copy of the audio signal from an emitter device such as emitter 110 and/or emitter 120. Multiple composite signals may be received at the same or overlapping times. Receiver-device-signal identifying system 150 includes a high-frequency copy retrieving component 156 for filtering an inaudible-frequency copy of the audio signal. Receiver-device-signal identifying system 150 further includes a base signal obtaining component 158 for reversing a frequency change to the high-frequency copy of the audio signal to discover a copy of the base audio signal. Receiver-device-signal identifying system 152 also includes a base signal using component 160 for using the discovered copy of the base signal. Base signal using component 160 may be used in a number of ways including to cancel an audio signal received from emitter 110 or 120, to identify an emitter 110 or 120 as the origin of the audio signal, to prioritize an audio signal from emitter device 110 or 120, etc.

As an illustrative example, receiver device 150 may be, for example, a smart assistant device. Receiver device 150 may receive, via composite sound receiving component 154, an overall input signal including a voice command from a user (not pictured in FIG. 1), composite signal 119, and composite signal 129. Receiver device 150 may, via high-frequency copy retrieving component 156, identify a first high-frequency copy signal in composite signal 119 and a second high-frequency copy signal included in composite signal 129. For example, receiver device 150 may, via component 156, apply a high-pass filter to composite signal 119. The high-pass filter may have a lower limit corresponding to an upper limit of a human hearing range. For example, the high-pass filter may have a lower limit of 20,000 Hz.

Receiver device 150 may, via base signal obtaining component 158, discover a first base signal included in composite signal 119 and a second base signal included in composite signal 129. Receiver device 150 may, via base signal using component 160, identify that the first base signal (i.e., the signal included in composite signal 119) is a song, and that emitter 110 is a personal speaker. Receiver device 150 may further, via base signal using component 160, cancel the first base signal from an overall input signal. Receiver device 150 may also, via base signal using component 160, identify that the second base signal (i.e., the base signal included in composite signal 129) is an emergency announcement and that emitter 120 is an emergency alert system. Based on the identification of composite signal 129, receiver device 150 may further, via base signal using component 160, leave composite signal 129 in the overall input signal. Thus, while the song emitted by emitter device 110 may be filtered/cancelled from the overall input signal, the voice command and the emergency announcement may both still be received by a processing system of receiver device 150.

Figure 2:
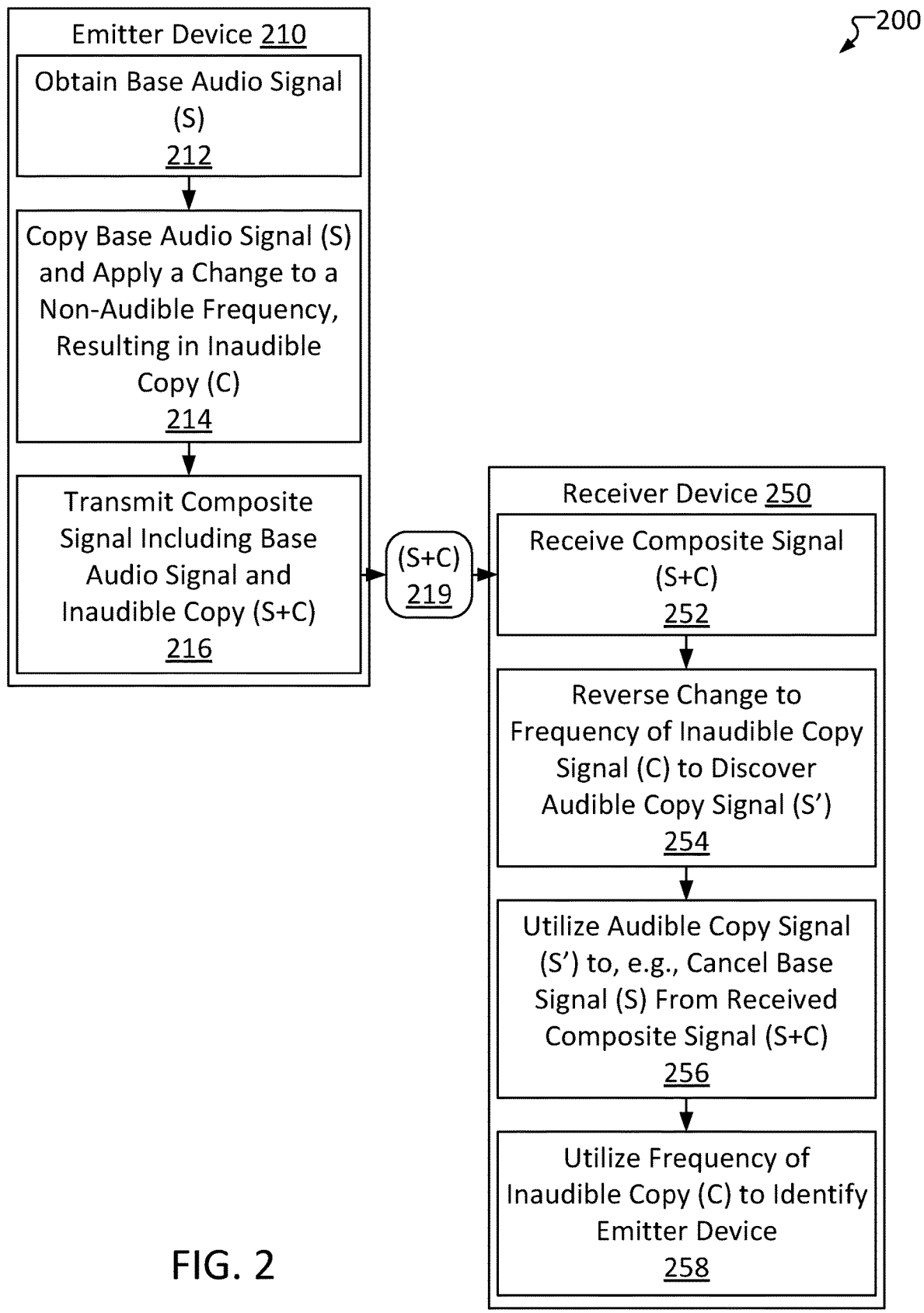
FIG. 2 is a flow diagram depicting an example method being implemented by an example emitter device and an example receiver device, consistent with several embodiments of the present disclosure.

FIG. 2 is a flow diagram 200 depicting an example method being implemented by an example emitter device 210 and an example receiver device 250, consistent with several embodiments of the present disclosure.

At emitter device 210, the method may obtain 212 a base audio signal S of a sound to be emitted from emitter device 210. The method may copy 214 the base audio signal and apply a frequency change to the copy to result in an inaudible frequency copy of the audio signal, C. The inaudible frequency may be above the human audible frequency range. The method may also apply a predefined amplitude ratio to the inaudible frequency copy, such as a configured amplitude reduction, to reduce the copied signal volume. In some embodiments, the audio signal copy may be inverted at the emitter device 210 such that the inaudible frequency copy C is an inverted copy. The applied frequency change and any amplitude change for an emitter device 210 may be communicated to a receiver device as part of a handshake process.

The frequency change of the copy to a higher frequency may result in a shorter duration of the signal compared to the original sound signal and the inaudible frequency copy may be repeated within the duration of the original sound signal. Alternatively, a gap may be provided before or after the shorter duration inaudible frequency copy.

In a controlled environment such as a home, the frequency range may be designated for each emitter device so that the origin of the signal can be identified using the inaudible frequency copy. This may allow any receiver device such as receiver 150 in the environment to be able to identify the source of every electronically produced sound the receiver device hears that uses the described method.

The frequency change may be applied in a manner to ensure that no overlap exists between the frequency of the base signal S and the inaudible copy C. Further, the frequency change may be applied such that the copy of the audio signal is entirely above the human audible frequency range. Thus, the change may be applied such that the lowest frequency component of the audio signal is adjusted to be above both the human audible frequency range and the highest frequency component of the audio signal. For example, a base signal S may have a frequency range of 3,000 Hz-10,000 Hz, and the human audible frequency range may be from 20 Hz to 20,000 Hz. Thus, in this example, a frequency change may be applied to a copy C of S such that the lowest frequency of the copy C (i.e., the portion corresponding to the 3,000 Hz portion of the base signal S) is above both the highest frequency of the base signal S (i.e., above 10,000 Hz) and the highest frequency of the human audible frequency range (i.e., 20,000 Hz). Thus, inaudible copy C may have a frequency range of 20,100 Hz-27,100 Hz (by shifting the frequency up by 17,100 Hz). In some instances, the lowest frequency of the inaudible copy C may be higher than the highest frequency of the base signal S even if the highest frequency of the base signal S is inaudible to humans. In some instances, rather than shifting the frequency by a set amount, the frequency may be multiplied by a factor f. For example, the factor f may be 7, such that inaudible copy C may have a frequency range of 21,000 Hz-30,000 Hz (by multiplying 3,000 Hz*7 and 10,000 Hz*7).

In some embodiments, the frequency change may be varied over time in a sequence of applied frequency changes as configured for an emitter device. In some embodiments, multiple frequency changes at different frequencies may be applied to the audio signal to result in multiple different inaudible frequency copies of the audio signal that are sent concurrently.

The method may transmit 216 a composite signal including the base audio signal and the inaudible-frequency copy of the audio signal, S+C 219. This may result in a processing delay before transmitting the original audio signal by using a buffering of the original audio signal to allow for the generation of the inaudible frequency copy to be generated. In embodiments in which multiple different inaudible frequency copies of the audio signal are generated, the method transmits 216 the audio signal and each of the plurality of inaudible frequency copies.

At receiver device 250, the method receives 252 the composite signal including the base audio signal and the inaudible frequency copy of the audio signal, S+C and discovers 254 the audio signal by applying a reversing change to the frequency of the inaudible copy signal back to the audible frequency to obtain an audible copy audio signal S'. The receiver device 250 knows the frequency shift (and optionally an amplitude shift) for given emitter devices from which it is receiving audio signals. This may be agreed by a handshake procedure between the devices.

The method may use 256 the discovered audio signal S', for example, to cancel out the base audio signal S. In embodiments in which the audio signal copy is inverted at the emitter device 210 such that the inaudible frequency copy C is an inverted copy, the obtained audible copy of the audio signal S' at the receiver device 250 is already an inverted copy suitable for cancelling the audio signal S.

Other uses 256 of the obtained audio signal S' may alert a user to an audio signal S, for example, for prioritizing the audio signal over other incoming signals or signals transmitted from receiver device 250. The method may also use 258 the frequency of the inaudible copy C to identify the emitting device.

When emitter devices such as emitters 110 and/or 120 emit sounds which are not intended to be useful input for any receiver device such as receiver 150, they superimpose an inaudible frequency copy of the sound on top of their output at a predefined frequency and amplitude ratio to the sound. The inaudible frequency may be of a high enough frequency such that a human would not be able to hear it. The human audible frequency range is considered to be from 20 Hz to 20 kHz. There are already a number of devices and applications which send high frequency signals between each other in the home and therefore sending high frequency signals in this manor will not be an issue in a home for pets, etc.

The receiver device 150 may assume that any input within a specified frequency range outside the human hearing range is a copy of a sound produced by an emitter device such as emitter device 110 and/or 120. With the inaudible copies of all unintended sounds, the receiver device 150 is able to discover the exact sound wave audible signal produced by an emitter device 110 120. This is done by performing the inverse of the algorithm used to create the high-frequency copy.

An additional benefit to systems and methods of the present disclosure is that receiver devices such as receiver 150 may only be made aware of sounds produced by other devices that they will actually hear, as the copied signal is inaudible. This is not always the case when using a network such as Wi-Fi to communicate what noise is being produced by a device, as a Wi-Fi network is not aware of the acoustics and proximity of devices in a given environment, particularly where people are moving, doors are opening and shutting, etc.

As an illustrative example, a smart assistant and two speakers may be in a house connected to a Wi-Fi network. The Wi-Fi network may be transmitting information to the smart assistant describing noise being produced by the two speakers. The first speaker may be playing a song and may be located in close proximity to the smart assistant, while the second speaker may be outputting audio for a movie and may be located in a different room relatively far from the smart assistant. The smart assistant may be receiving information describing the noise produced by both speakers. However, only the first speaker's noise (i.e., the song) may be "heard" by the smart assistant. Thus, the computing resources (processing power, network bandwidth, etc.) spent on the second speaker's noise (i.e., the audio of the movie) may be wasted. Utilizing systems and methods consistent with the present disclosure, the smart assistant may only receive information regarding noise that the smart assistant can actually "hear," thus saving resources.

Figure 3:
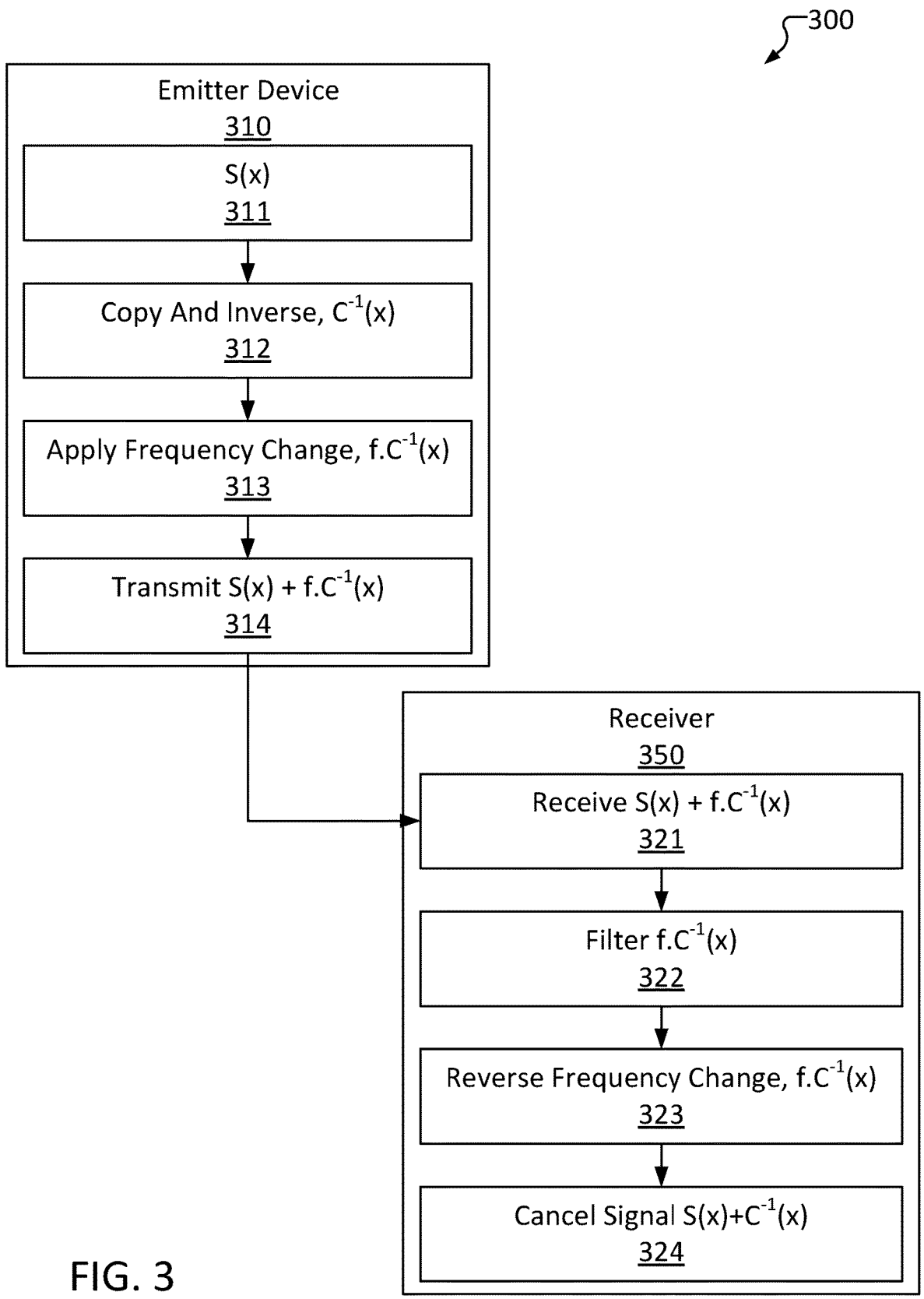
FIG. 3 is a flow diagram of an example embodiment of the method of FIG. 2.

FIG. 3 is a flow diagram 300 of an example embodiment of the method of FIG. 2. Flow diagram 300 shows an example embodiment including inverting of the audio signal from an emitter device 310 for cancelling the audio signal at a receiver device 350.

As shown in flow diagram 300, at an emitter device 310, an audio signal $S(x)$ 311 is copied and inverted $C^{-1}(x)$ 312 and has a frequency change applied to make an inaudible copy signal $f \cdot C^{-1}(x)$ 313. The combination of the audio signal and the inaudible copy signal, $S(x)+f \cdot C^{-1}(x)$ 314, is transmitted from emitter device 310.

At a receiver device 105, the combination of the audio signal and the inaudible copy signal, $S(x)+f \cdot C^{-1}(x)$ 321 is received, filtered to obtain the inaudible copy signal $f \cdot C^{-1}(x)$ 322, has the frequency change reversed to result in the inverted copy signal $C^{-1}(x)$ 323, which is used to cancel the incoming audio signal, $S(x)+C^{-1}(x)=0$ 324.

For extra prevention, a long string of frequency ranges may be agreed ahead of time as part of a handshake or configuration process, and the frequency of the signal may be changed in a series at the agreed ranges, so that the malicious actor is not able to work them out. This may increase security as an interloper would struggle to exhaustively superimpose the correct sounds to cause a disturbance in the method.

Figure 4:
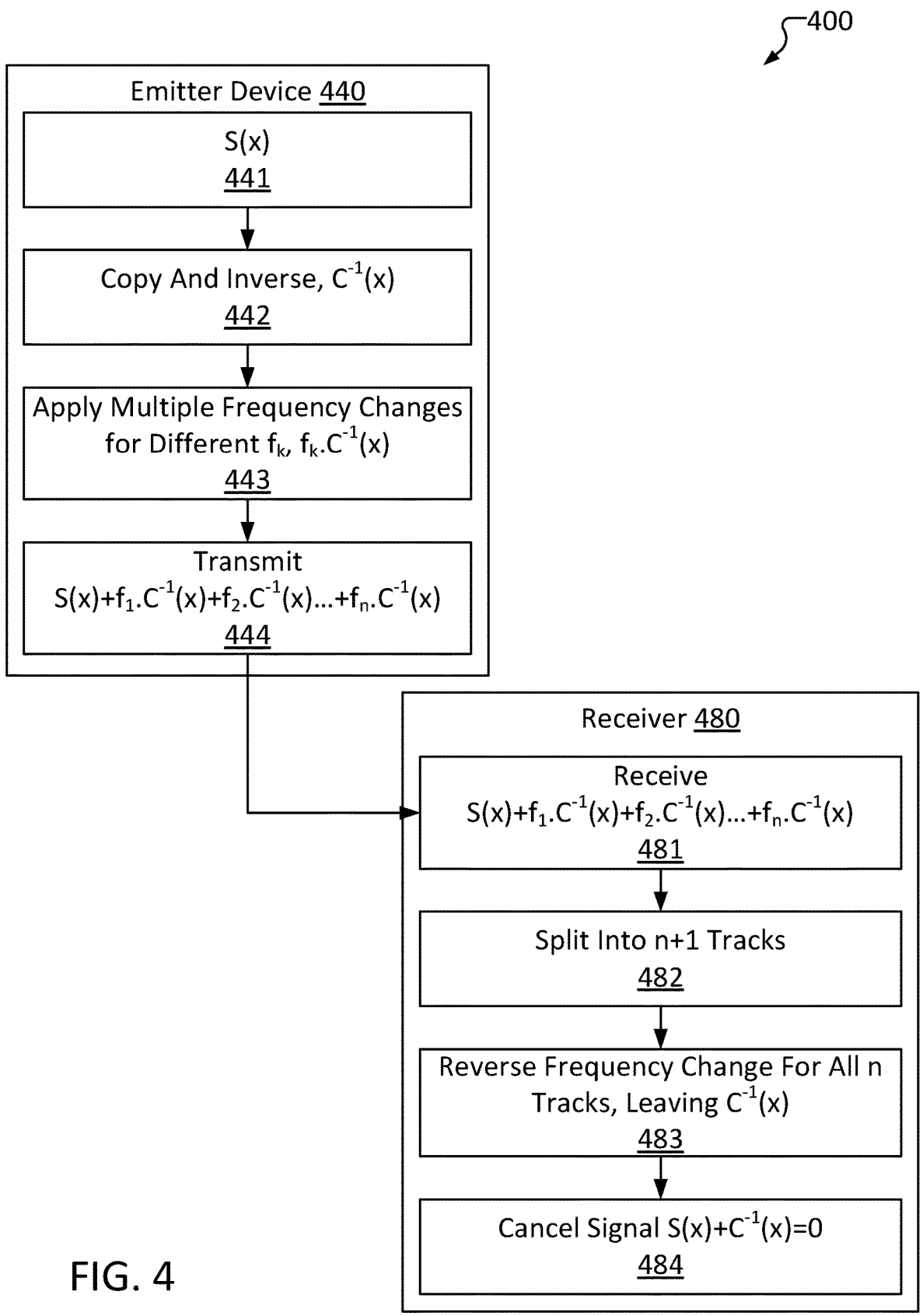
FIG. 4 is an additional flow diagram of an example embodiment of the method of FIG. 2.

FIG. 4 is an additional flow diagram 400 showing an example embodiment including inverting of the audio signal from an emitter device 440 for cancelling the audio signal at a receiver device 480 and applying multiple frequency changes to the audio signal.

As shown in flow diagram 400, an emitter device 440, an audio signal $S(x)$ 441 is copied and inverted $C^{-1}(x)$ 342. The copied inverted signal has multiple frequency changes applied for difference frequency factors $f_k$, to obtain multiple inaudible copy signals $f_k \cdot C^{-1}(x)$ 443. A combination of the audio signal and the multiple inaudible copy signals, $S(x)+f_1 \cdot C^{-1}(x)+f_2 \cdot C^{-1}(x)+f_3 \cdot C^{-1}(x)+ \ldots +f_n \cdot C^{-1}(x)$ 444, is transmitted from the emitter device 540.

At a receiver device 480, the combination of the audio signal and the multiple inaudible copy signals, $S(x)+f_1 \cdot C^{-1}(x)+f_2 \cdot C^{-1}(x)+f_3 \cdot C^{-1}(x)+ \ldots +f_n \cdot C^{-1}(x)$ is received at 481. The incoming composite signal is split into n+1 tracks at 482 and each track has its frequency change reversed to obtain the inverted copy signal $C^{-1}(x)$ at 483. The "true" audio signal may be determined to be the sound that is present in all n transposed tracks. The true audio signal may be used to cancel the incoming audio signal, $S(x)+C^{-1}(x)=0$ at 484.

To prevent erroneous noise cancelling at the input from high frequency sounds which are not from devices using this protocol, multiple high frequency ranges may be used to send multiple high frequency copies of the audio. Once the high frequency copies are converted to the human hearing range, a pre-defined one of the high frequency copies is selected to be used, such as the lowest frequency.

Referring to FIG. 5A to FIG. 5F, soundwave diagrams illustrate a simplified example of the described method.

Figure 5A:
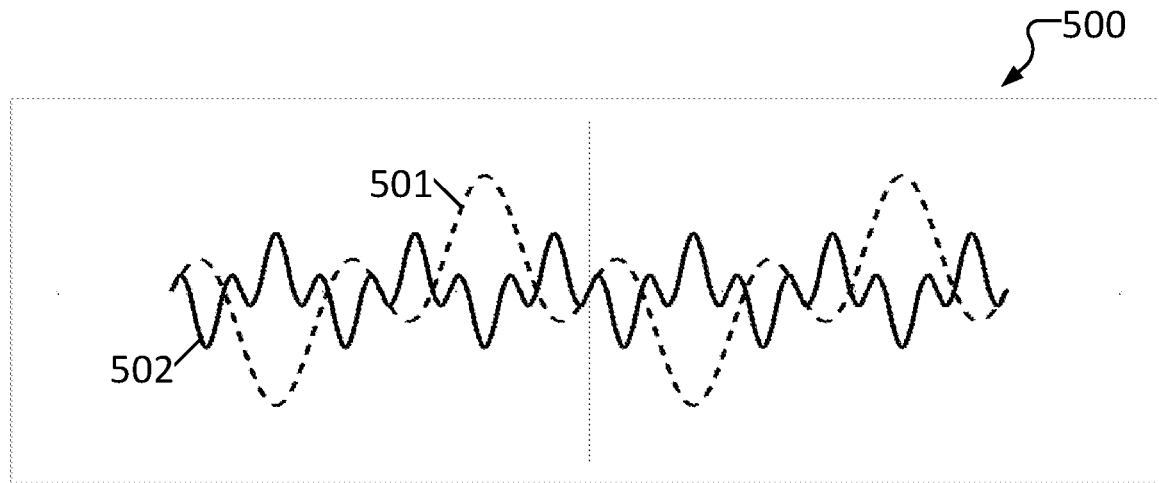
FIG. 5A, FIG. 5B, FIG. 5C, FIG. 5D, FIG. 5E, and FIG. 5F are block diagrams illustrating example signals at various stages of an example signal processing method, consistent with several embodiments of the present disclosure.

FIG. 5A shows soundwaves 500 produced by a single emitter device such as a speaker. A first soundwave 501 represents a soundwave produced in human hearing range (i.e. the original sound). A second soundwave 502 is shown with a much higher frequency, representing the high frequency output from the speaker which is outside of human hearing range. In this example, the high frequency signal is repeated for the duration of the first soundwave 501.

The second soundwave 502 is computed using an algorithm by the emitter device before output so that other digital devices can pick it up and reverse engineer it to work out the original sound 501 emitted by this device.

The algorithm inverts the original sound and then increases the frequency by a factor of f, where f is determined by the emitter, to reach a frequency not heard by humans. The factor f may ensure that frequencies of sounds of soundwave 501 that occur at the bottom of human hearing ranges (e.g., approximately 20 Hz), when inverted, are at least above the minimum frequency required above human hearing (e.g., above approximately 20,000 Hz).

Figure 5B:
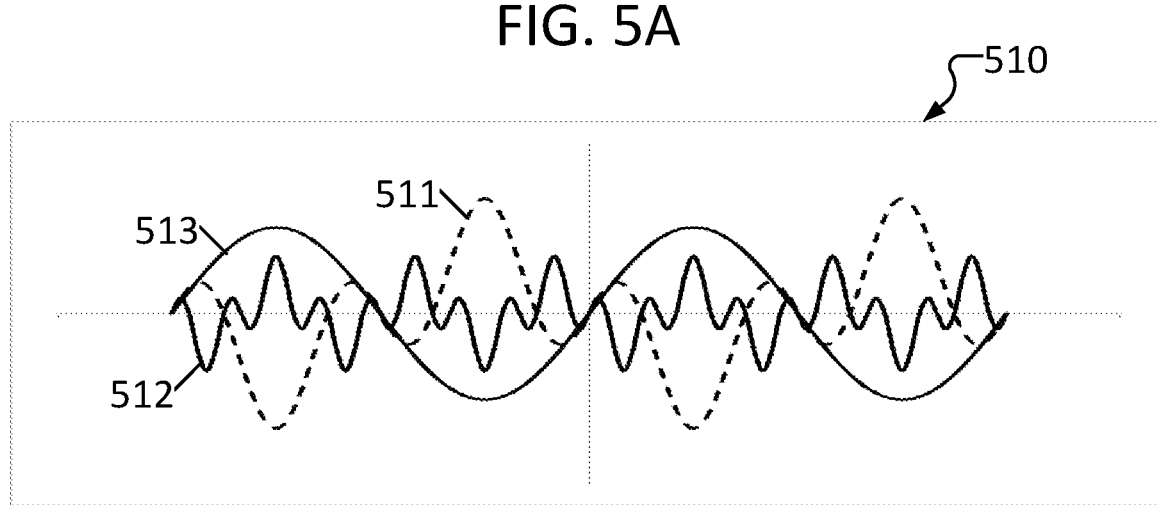

FIG. 5B shows soundwaves 510 picked up by a single microphone of a receiver device. The first and second soundwaves 511, 512 are the same as soundwaves 501 and 502 in FIG. 5A. The third soundwave 513 is the desired input for the microphone. For example, soundwave 513 may be a speech input to a smart assistant device.

Figure 5C:
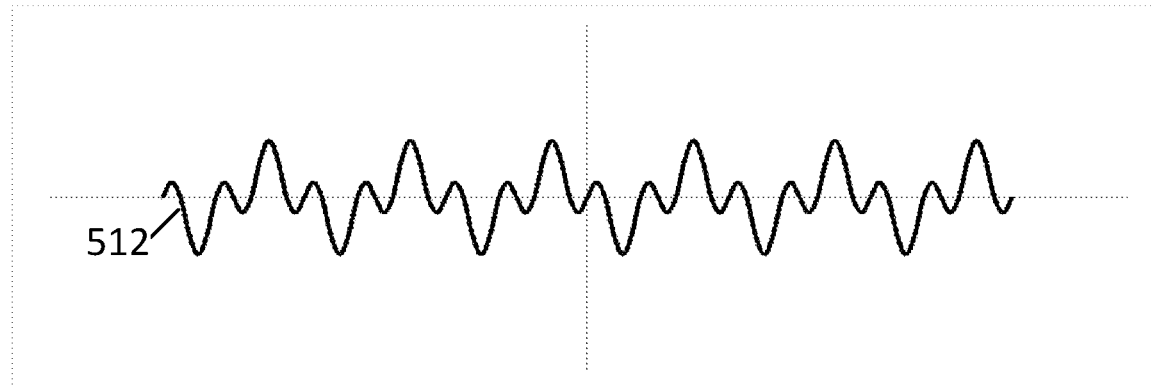

FIG. 5C shows a output 520 of FIG. 5B after having gone through a high pass filter where the threshold frequency is set to the bottom frequency audible by human hearing multiplied by f explained above. This results in just the isolated high frequency second soundwave 512.

Figure 5D:
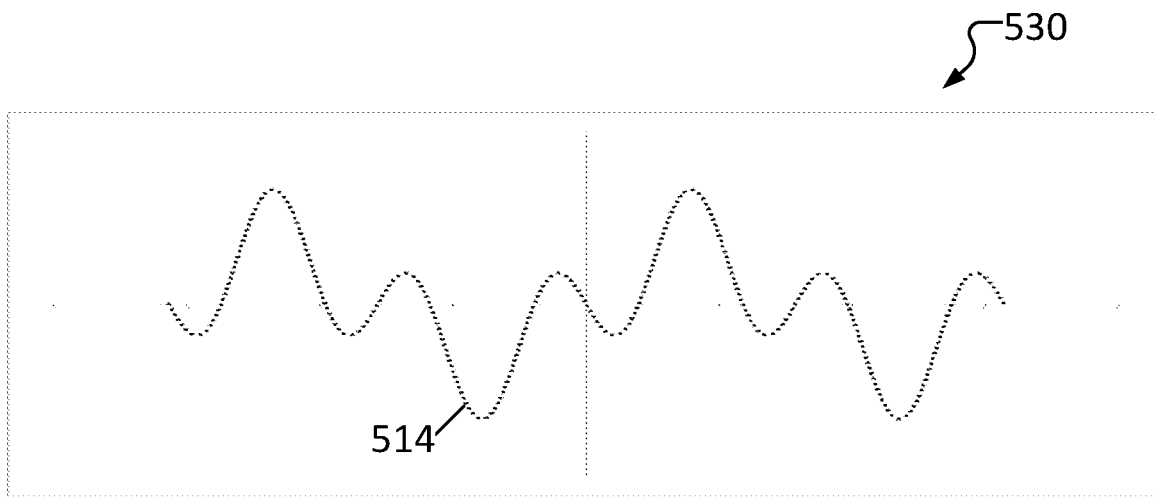

FIG. 5D shows an output 530 of FIG. 5C after reducing the frequency of the second soundwave 512 by a factor of f to reverse the frequency change of the original soundwave. The resulting soundwave is then inverted. This results in a fourth soundwave 514 that is the inverse of the original soundwave 501 from FIG. 5A.

Figure 5E:
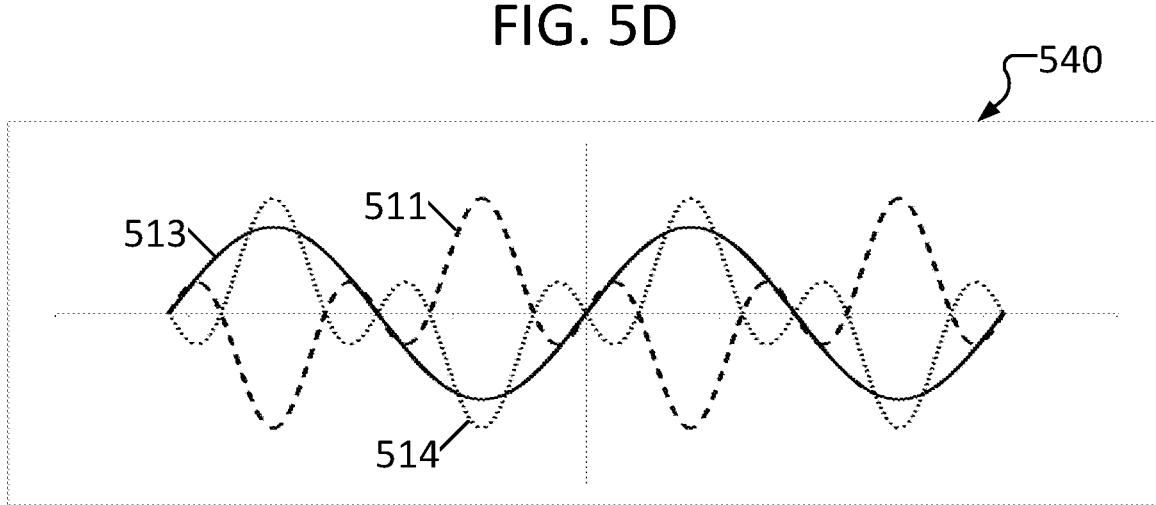

FIG. 5E shows 540 an output of FIG. 5B after going through a low pass filter with the addition of the soundwave 514 from FIG. 5D. The first soundwave 511 and the fourth soundwave 514 cancel out as they are inverse soundwaves. Soundwave 512 is filtered out via the low pass filter.

Figure 5F:
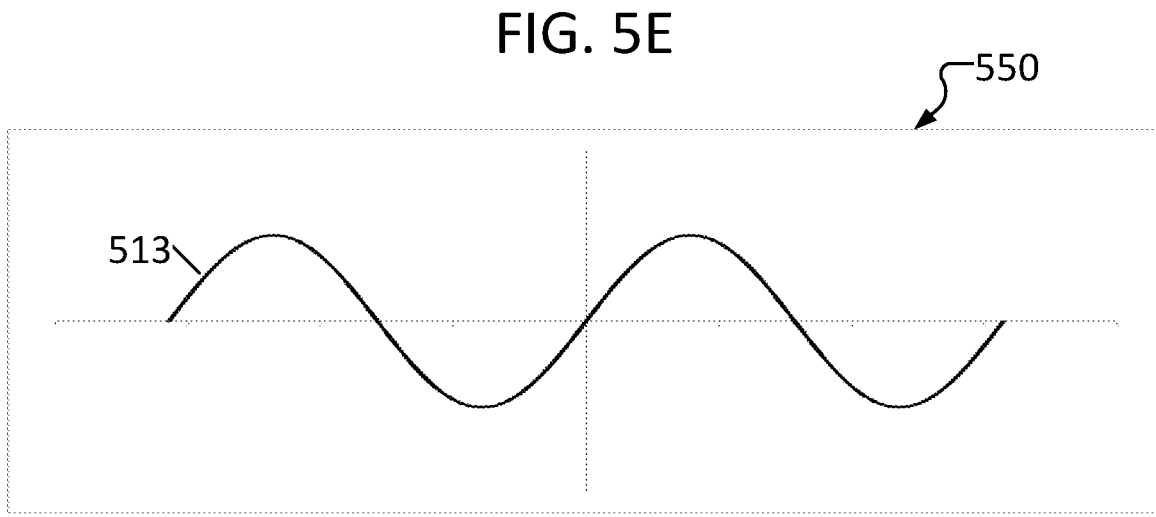

FIG. 5F shows 550 the resulting soundwave 513 from superimposing all lines in FIG. 5E, which is the intended input for the microphone with sound from the speaker removed.

The described method is able to cancel out multiple disruptive noises within human audible range. The method filters out frequencies dynamically, based on the out-of-human-hearing superimposed sounds. The method is able to distinguish between ambient noise created by digital devices as opposed to noise from natural sources.

A single receiving device microphone may be used with no need for a microphone closer to the desired sound source.

In an example implementation, multiple audio speakers may be emitter devices used throughout a house as part of a home sound system, including television soundbars, as well as stand-alone speakers in other rooms. A voice-activated personal assistant may be a receiver device. When a user tries to ask the voice-activated personal assistant a question or asks a command, the personal assistant may utilize the described method to eliminate any background sound coming from music or TV sound being played through the speakers.

In addition, smart speakers, televisions, laptops, and mobile phones may include built-in assistant functionality. All these devices may produce background noise and yet may also need to listen to voice commands and, with their smartphones, voice for calls as well. This is another example of an implementation of the described method. If the devices all work with agreed inaudible frequencies, either by being manufactured by the same entity or by agreement between entities, noise cancellation may be carried out.

Figure 6:
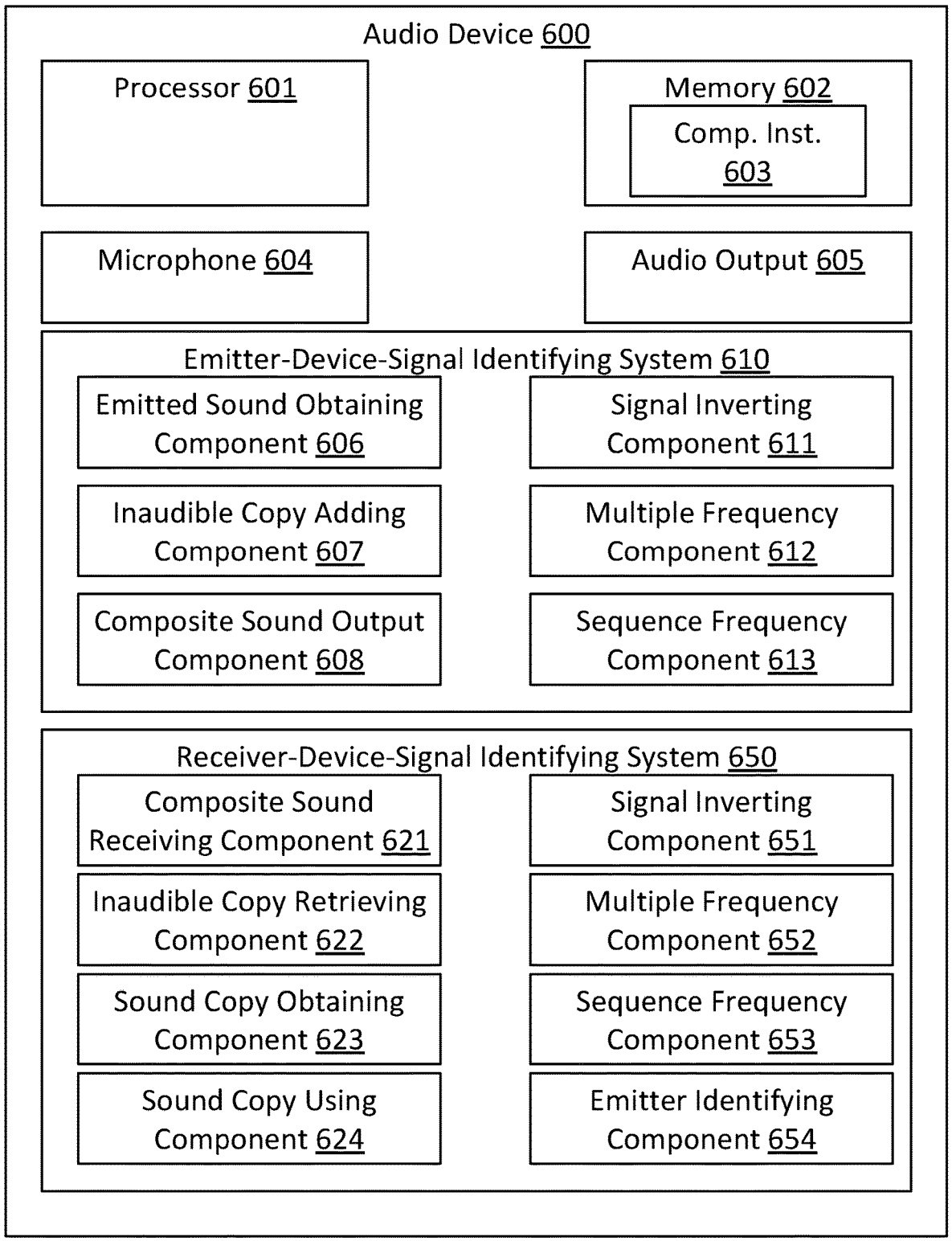
FIG. 6 is a block diagram of an example system including an emitter device and a receiver device, consistent with several embodiments of the present disclosure.

FIG. 6 is a block diagram of an example audio device 600 including an emitter device and a receiver device, consistent with several embodiments of the present disclosure. Enabling an audio device 600 to be able to cancel a noise from a received input without a need for information to be sent using any other input methods.

The audio device 600 may include at least one processor 601, a hardware module, or a circuit for executing the functions of the described components. In some instances, the described components may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components. The processor 601 and memory 602 may be a microcontroller.

The audio device 600 includes a microphone 604 for receiving audio signals and an audio output 605 for transmitting audio signals.

The audio device 600 may include an emitter-device-signal identifying system 610 and a receiver-device-signal identifying system 650 for providing device identification, such as that described above with reference to FIG. 1.

Emitter-device-signal identifying system 610 includes an emitted sound obtaining component 606 for obtaining an audio signal to be emitted from the emitter device. Emitter-device-signal identifying system 610 further includes an inaudible copy adding component 607 for processing a copy of the audio signal to apply a frequency change to result in an inaudible frequency copy of the audio signal. Emitter-device-signal identifying system 610 further includes a composite sound output component 608 for transmitting the audio signal and the inaudible frequency copy of the audio signal concurrently.

Emitter-device-signal identifying system 610 may also include a signal inverting component 611 for inverting the copy of the audio signal. Emitter-device-signal identifying system 610 may also include a multiple frequency component 612 for applying a plurality of frequency changes at different frequencies concurrently to result in a plurality of inaudible frequency copies. Emitter-device-signal identifying system 610 may also include a sequence frequency component 613 for applying a plurality of frequency changes at different frequencies sequentially to change the applied frequency change over time.

The receiver-device-signal identifying system 650 includes a composite sound receiving component 621 for receiving an audio signal and an inaudible frequency copy of the audio signal. Receiver-device-signal identifying system 650 further includes an inaudible copy retrieving component 622 for filtering the inaudible frequency copy of the audio signal. Receiver-device-signal identifying system 650 further includes a sound copy obtaining component 623 for reversing a frequency change to the inaudible frequency copy of the audio signal to discover a copy of the audio signal. Receiver-device-signal identifying system 650 further includes a sound copy using component 624 for using the copy of the discovered audio signal.

Receiver-device-signal identifying system 650 may include a signal inverting component 651 for inverting the copy of the audio signal to cancel the received audio signal. Receiver-device-signal identifying system 650 may include a multiple frequency component 652 for reversing a plurality of frequency changes at different frequencies received concurrently to result in a plurality of inaudible frequency copies. Receiver-device-signal identifying system 650 may include a sequence frequency component 653 for reversing a plurality of frequency changes at different frequencies sequentially as the applied frequency changes over time. Receiver-device-signal identifying system 650 may include an emitter identifying component 654 for identifying emitter device based on the frequency of the filtered inaudible frequency copy.

Emitter-device-signal identifying system 610 and receiver-device-signal identifying system 650 may each be provided at a device in combination or individually depending on the functionality of the device.

Figure 7:
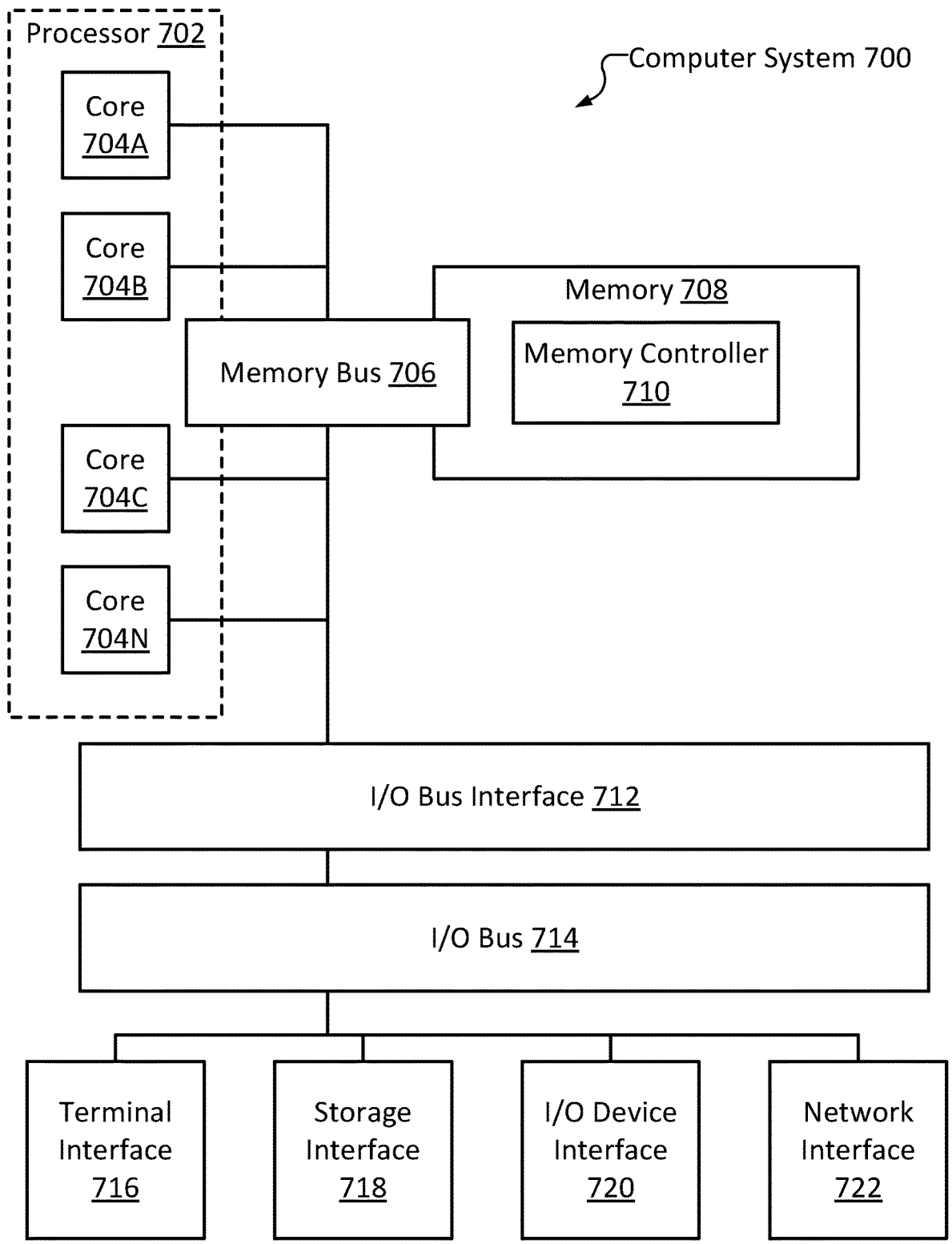
FIG. 7 is a high-level block diagram of an example computer system that may be used in implementing embodiments of the present disclosure.

Referring now to FIG. 7, shown is a high-level block diagram of an example computer system 700 that may be configured to perform various aspects of the present disclosure, including, for example, the methods described with respect to flow diagrams 200, 300, and 400. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise one or more CPUs 702, a memory subsystem 708, a terminal interface 716, a storage interface 718, an I/O (Input/Output) device interface 720, and a network interface 722, all of which may be communicatively coupled, directly or indirectly, for inter-component communication via a memory bus 706, an I/O bus 714, and an I/O bus interface unit 712.

The computer system 700 may contain one or more general-purpose programmable processors 702 (such as central processing units (CPUs)), some or all of which may include one or more cores 704A, 704B, 704C, and 704N, herein generically referred to as the CPU 702. In some embodiments, the computer system 700 may contain multiple processors typical of a relatively large system; however, in other embodiments the computer system 700 may alternatively be a single CPU system. Each CPU 702 may execute instructions stored in the memory subsystem 708 on a CPU core 704 and may comprise one or more levels of on-board cache.

In some embodiments, the memory subsystem 708 may comprise a random-access semiconductor memory, storage device, or storage medium (either volatile or non-volatile) for storing data and programs. In some embodiments, the memory subsystem 708 may represent the entire virtual memory of the computer system 700 and may also include the virtual memory of other computer systems coupled to the computer system 700 or connected via a network. The memory subsystem 708 may be conceptually a single monolithic entity, but, in some embodiments, the memory subsystem 708 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 708 may contain elements for control and flow of memory used by the CPU 702. This may include a memory controller 710.

Although the memory bus 706 is shown in FIG. 7 as a single bus structure providing a direct communication path among the CPU 702, the memory subsystem 708, and the I/O bus interface 712, the memory bus 706 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method, comprising:
    obtaining an audio signal to be emitted from an emitter device;
    creating an inaudible frequency copy of the audio signal by applying a plurality of frequency changes at different frequencies concurrently to the audio signal to result in a plurality of inaudible frequency copies, wherein there is no frequency overlap between the inaudible frequency copy of the audio signal and the audio signal, and wherein the inaudible frequency copy of the audio signal is above a threshold frequency of human hearing; and
    transmitting the audio signal and each of the plurality of inaudible frequency copies of the audio signal concurrently.

2. The method of claim 1, further comprising:
    applying a configured amplitude reduction to the inaudible frequency copy of the audio signal to reduce the volume of the inaudible frequency copy.

3. The method of claim 1, wherein the creating further comprises inverting the audio signal and wherein the inaudible frequency copy of the audio signal is an inverted inaudible frequency copy.

4. The method of claim 1, further comprising configuring the plurality of frequency changes for the emitter device and communicating the configuration to a receiver device.

5. A method, comprising:
    concurrently receiving a first audio signal and a second audio signal from an emitter device;
    detecting that the second audio signal is an inaudible frequency copy of the first audio signal, wherein there is no frequency overlap between the inaudible frequency copy of the first audio signal and the first audio signal, and wherein the inaudible frequency copy of the first audio signal is above a threshold frequency of human hearing;
    identifying a frequency change configured for the emitter device;
    reversing the frequency change of the second audio signal, resulting in a copy of the first audio signal;
    using the copy of the first audio signal;
    receiving a third audio signal;
    detecting that the third audio signal is an additional inaudible frequency copy of the first audio signal; and
    reversing an additional frequency change of the additional inaudible frequency copy of the first audio signal, resulting in a second copy of the first audio signal.

6. The method of claim 5, wherein using the copy of the first audio signal comprises cancelling out the first audio signal.

7. The method of claim 6, wherein the cancelling includes:
    inverting the copy of the first audio signal; and
    superimposing the inverted copy of the first audio signal over the first audio signal to cancel out the first audio signal.

8. The method of claim 6, wherein:
    the second audio signal is an inverted inaudible frequency copy of the first audio signal;
    the reversing the frequency change of the second audio signal results in an inverted copy of the first audio signal; and
    the cancelling includes superimposing the inverted copy of the first audio signal over the first audio signal to cancel out the first audio signal.

9. The method of claim 5, further comprising identifying, based on a frequency of the inaudible frequency copy, the emitter device.

10. A system, comprising:
    a memory, and
    a processor coupled to the memory, the processor configured to execute instructions to:
        obtain a first audio signal to be emitted from an emitter device;
        generate a copy of the first audio signal;
        apply a frequency change to the copy of the first audio signal, resulting in a second audio signal, wherein the second audio signal is an inaudible frequency copy of the first audio signal, wherein there is no frequency overlap between the inaudible frequency copy of the first audio signal and the first audio signal, and wherein the inaudible frequency copy of the first audio signal is above a threshold frequency of human hearing;
        emit the first audio signal and the second audio signal concurrently;
        receive a third audio signal and a fourth audio signal from the emitter device;
        detect that the fourth audio signal is an inaudible frequency copy of the third audio signal;
        identify the frequency change configured for the emitter device;

reverse the frequency change of the fourth audio signal, resulting in a copy of the third audio signal; and
use the copy of the third audio signal.

11. The system of claim 10, wherein the processor is further configured to invert the copy of the first audio signal.

12. The system of claim 10, wherein the processor is further configured to apply a plurality of frequency changes at different frequencies concurrently to result in a plurality of inaudible frequency copies.

13. The system of claim 10, wherein the processor is further configured to apply a plurality of frequency changes at different frequencies sequentially to change the applied frequency change over time.

14. The system of claim 10, wherein the processor is further configured to detect that the inaudible frequency copy of the third audio signal is an inverted inaudible frequency copy of the third audio signal.

15. The system of claim 10, wherein the processor is further configured to identify the third audio signal based on the frequency of the fourth audio signal.

* * * * *